(No Model.)

E. F. SMITH.
HANDLE FOR COFFEE OR TEA POTS.

No. 425,349. Patented Apr. 8, 1890.

Witnesses:
E. A. Ellis
B. Brockett

Inventor:
E. F. Smith,
per
F. A. Lehmann,
atty.

UNITED STATES PATENT OFFICE.

EDWARD FRANCIS SMITH, OF ROCHESTER, ASSIGNOR OF ONE-HALF TO NELSON R. STREETER, OF GROTON, NEW YORK.

HANDLE FOR COFFEE OR TEA POTS.

SPECIFICATION forming part of Letters Patent No. 425,349, dated April 8, 1890.

Application filed December 23, 1889. Serial No. 334,630. (No model.)

*To all whom it may concern:*

Be it known that I, EDWARD FRANCIS SMITH, of Rochester, in the county of Monroe and State of New York, have invented certain new and useful Improvements in Handles for Coffee or Tea Pots; and I do hereby declare the following to be a full, clear, and exact description of the invention, such as will enable others skilled in the art to which it pertains to make and use it, reference being had to the accompanying drawings, which form part of this specification.

My invention relates to an improvement in handles for tea or coffee pots; and it consists in the arrangement of parts to be more fully described hereinafter, and specially pointed out in the claims.

The object of my invention is to apply to the cover of a tea or coffee pot or a vessel of any kind requiring a cover a spring-actuated operating-lever, by means of which the cover can be raised and closed by the fingers of the hand used in holding the vessel.

Figure 1:
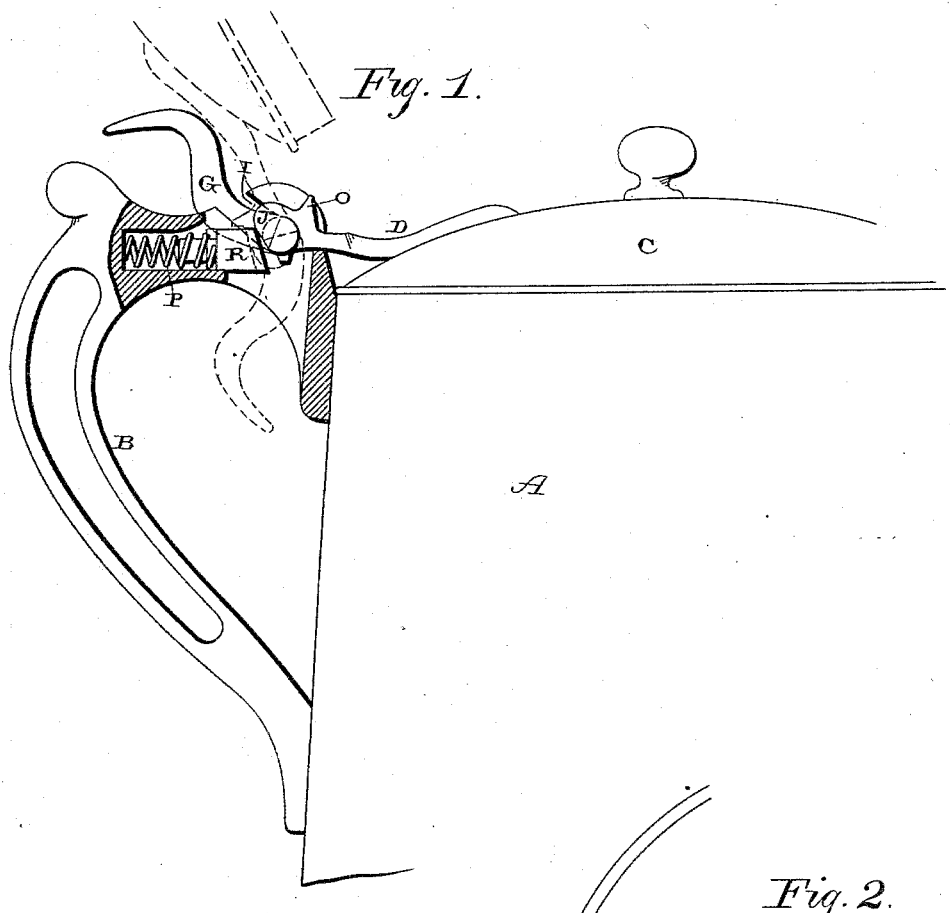
Figure 2:
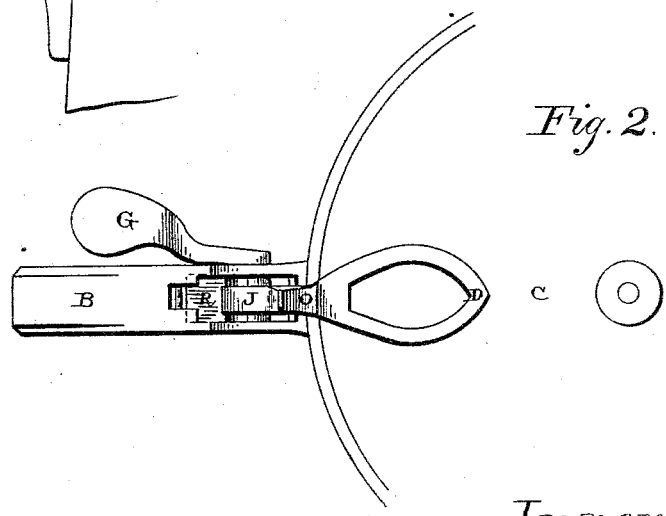

Figure 1 is a side elevation, partly in section, of a handle embodying my invention. Fig. 2 is a plan view of the same.

A represents a tea or coffee pot or vessel of any kind, B the handle, and C the cover. Secured to the cover at one side is the inner end D of the operating handle or lever G, which is provided with suitable journals or bearings which are placed in a suitable open-ended slot I, which is formed in the top of the handle, as shown. At or near the center of this operating-lever is formed a cam J and a shoulder, stop, or projection O.

Placed in a horizontal opening or recess formed in the top of the handle and just back of the central portion of the operating-lever is an operating-spring P and the horizontal moving or sliding follower R, which bears against the cam at the inner end for the purpose of continuing the movement of the lever after it has passed a certain point and against which the shoulder or projection O catches for the purpose of limiting the upward movement of the cover after it has reached a certain point. This stop and the shoulder upon the lever prevent the lower end of the lever G from moving sufficiently far to strike against the tea or coffee pot, and thus becoming heated to such an extent that it would be unpleasant to have the finger applied thereto.

The inner end of the spring-actuated follower R is inclined, as shown, and engages the inner inclined surface of the cam J. By means of this form and co-operation of the follower and cam the lever G is normally held in a horizontal position, thus closing the cover upon the top of the pot until the cover reaches a vertical position, when the upper face of the cam or inclined face projection J engages the said follower, in which position the spring-actuated follower locks the cover in a vertical position, as shown in dotted lines in Fig. 1. The lug or projection O is formed just in front of the upper face of the projection or cam J, and when the lever G reaches the proper position to cause the upper face of the projection to engage the spring-actuated follower and thus lock it in that position the lug O forms a stop by engaging the upper side of the follower, thus limiting the movement of the lever to the proper degree to accomplish the above result.

When so desired, the lever, carrying the cover with it can be raised out of the open-ended slot, and thus allow the vessel to be freely cleaned whenever so desired.

By means of the construction here shown and described a very simple and cheap device is provided for operating the cover of the vessel by the hand which is applied to its handle, and thus the operator is always left free to use the other hand in any manner desired.

Having thus described my invention, I claim—

1. The combination, with a vessel and a handle secured thereto provided with a bearing near its upper inner end, of a lever provided with journals at or near its center, the cover secured to its inner end, and its rear end projecting backward and forming an operating-handle, a rearwardly-extending cam, and a spring-actuated follower placed in the handle and engaging the under side of the said cam, whereby the lever is held normally in a longitudinal position, substantially as shown.

2. The combination, with a vessel and a handle secured thereto provided with a bearing near its upper inner end, of a lever provided with journals at or near its center, the cover secured to its inner end, and its rear end projecting backward and forming an operating-handle, a rearwardly-extending cam upon the journals, and a spring-actuated follower placed in the handle having an inclined faced inner end which engages the cam, whereby the lever is held normally in a horizontal position, substantially as specified.

3. The combination, with a vessel and a handle secured thereto having a bearing near its upper inner end, of a lever having a journal at or near its center, a cover secured to its inner end, and its rear end extending backward and forming an operating-lever, a cam upon the journal having two bearing-surfaces, and a spring-actuated follower placed in the handle in a line with the cam and which engages therewith, whereby the cover is held in either a vertical or a longitudinal position, substantially as shown and described.

4. The combination, with a vessel and a handle secured thereto having a bearing near its upper inner end, of a lever having a journal at or near its center, the cover secured to its inner end and its rear end extending backward and forming an operating-handle, a spring-actuated follower placed in the said handle, a cam upon the said journal extending toward the follower having two bearing-surfaces which alternately engage the inner end of the follower, and a stop at the inner end of the upper surface which engages the follower and limits the movement of the lever, substantially as set forth.

In testimony whereof I affix my signature in presence of two witnesses.

EDWARD FRANCIS SMITH.

Witnesses:
H. NELSON PECK,
EDWARD O. GRADY.